United States Patent

[11] 3,555,330

| [72] | Inventor | David Veniaminovich Svecharnik |
| | | Ul. Dobroljubova 20, kv. 54, Moscow, U.S.S.R. |
| [21] | Appl. No. | 757,313 |
| [22] | Filed | Sept. 4, 1968 |
| [45] | Patented | Jan. 12, 1971 |

[54] SINGLE-PHASE AC NON-COMMUTATOR ELECTRIC MOTOR
3 Claims, 2 Drawing Figs.

[52] U.S. Cl. .................................................. 310/266, 310/68, 310/165
[51] Int. Cl. .................................................. H02k 1/22
[50] Field of Search ........................................ 310/266, 265, 269, 268, 155, 165, 67, 68, 68.4, 168, 261, 267, 198, 210; 318/138

[56] References Cited
UNITED STATES PATENTS

| 2,464,999 | 3/1949 | Swarr .......................... | 310/68.4X |
| 2,897,383 | 7/1959 | Barrows et al. ................ | 310/68.4UX |
| 3,418,505 | 12/1968 | Mihalko et al. ................ | 310/266 |
| 3,109,114 | 10/1963 | Henry-Baudot ............... | 310/268 |
| 3,159,760 | 12/1964 | Olofsson ....................... | 310/268X |
| 3,312,846 | 4/1967 | Henry-Baudot ............... | 310/266 |
| 3,335,348 | 8/1967 | Gossel ........................... | 310/68X |
| 3,209,187 | 9/1965 | Angele .......................... | 310/266 |
| 3,109,113 | 10/1963 | Henry-Baudot ............... | 310/266X |
| 3,060,336 | 10/1962 | Liimatainen et al. .......... | 310/68.4 |
| 3,329,846 | 7/1967 | Lawrenson .................... | 310/266 |

FOREIGN PATENTS

| 1,225,407 | 6/1960 | France .......................... | 310/168 |

Primary Examiner—Milton O. Hirshfield
Assistant Examiner—B. A. Reynolds
Attorney—Waters, Roditi, Schwartz & Nissen

ABSTRACT: A motor with two sets of concentric poles with a rotor therebetween. One set of poles generates AC flux and the other DC flux. The rotor is a hollow cylinder, with AC and DC windings thereon connected by rectifiers. Current generated in the AC windings is rectified and passed to the DC windings for reaction with the DC flux to generate a torque in the rotor.

PATENTED JAN 12 1971    3,555,330

SINGLE-PHASE AC NON-COMMUTATOR ELECTRIC MOTOR

The present invention relates to electric machines, and more specifically to single-phase AC non commutator electric motors.

There exist single-phase AC noncommutator electric motors with AC and DC rotor windings interconnected via rectifiers, in which the AC windings interact with AC excited stator poles, and the DC windings interact with DC excited stator poles.

A disadvantage of existing noncommutator electric motors of the above type resides in large weight and size.

An object of the present invention is to eliminate the above mentioned disadvantage.

The invention aims at providing a single-phase AC noncommutator electric motor of reduced size and weight.

This aim is achieved by the provision of a single-phase AC noncommutator motor with AC and DC rotor windings and two salient-pole stators one of which is excited by an alternating current and interacts with the AC windings and the other is excited by a direct current and interacts with the DC windings, in which, according to the invention, the rotor is a symmetrical ferromagnetic body of revolution with AC and DC windings on the opposite sides.

The rotor is preferably made as a hollow ferromagnetic cylinder with the AC and DC windings arranged on the outer and inner surface, respectively, and the stators are placed concentrically with the rotor.

Alternatively, the rotor may be a ferromagnetic disc with AC and DC windings arranged on its opposite sides. Said rotor being placed between two parallel stators.

The invention will be more fully understood from the following description of a preferred embodiment when read in connection with the accompanying drawings in which.

Figure 1:
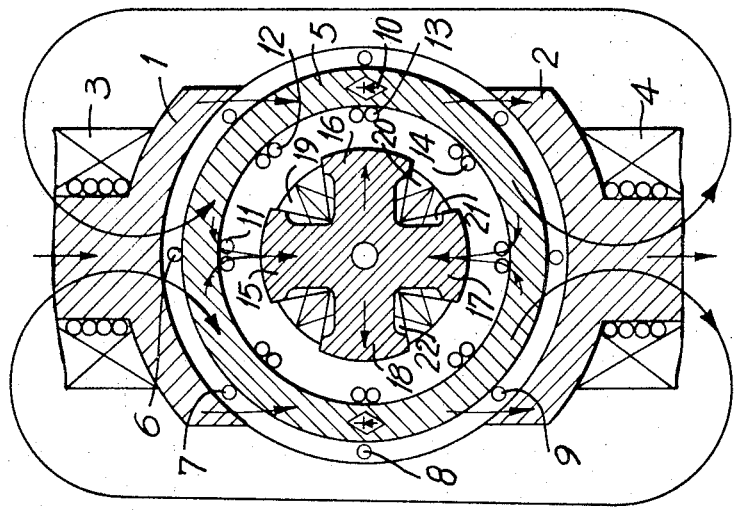
FIG. 1 is a sketch of a noncommutator electric motor with a hollow ferromagnetic rotor, according to the invention.

Referring to FIG. 1, there is a noncommutator electric motor in which the poles 1 and 2 of the outer stator carry coils 3 and 4 energized by a single-phase alternating current. Placed between the outer and inner salient-pole stators is a hollow ferromagnetic rotor 5 on whose outer side are arranged AC windings 6, 7, 8 and 9 wound with a diameter pitch and either placed in slots or applied as strips to the rotor surface as in printed circuits, depending on the power rating of the motor.

Figure 2:
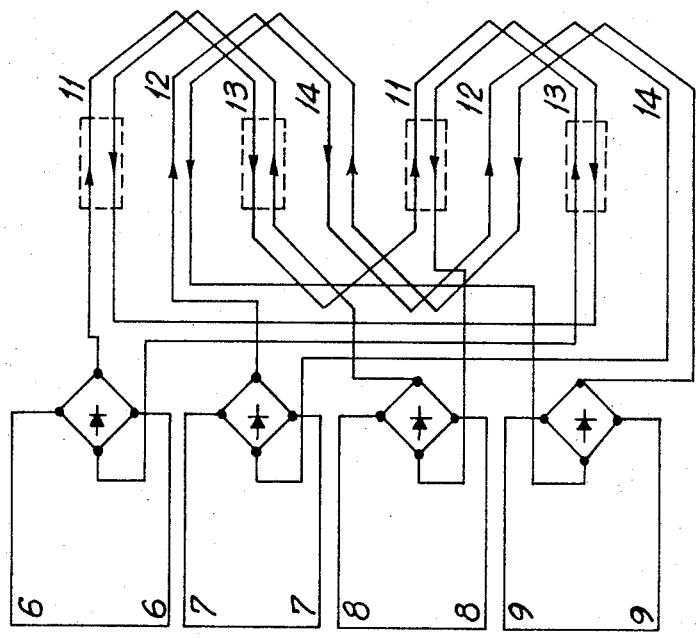
FIG. 2 is a connection diagram of the rotor windings.

The coil ends of each of the windings 6 through 9 contain rectifiers 10 arranged as a bridge circuit, whose leads are connected to DC windings 11 through 14 (FIG. 2) arranged on the inner side of the rotor 5. The rectifiers 10, as shown, can be mounted on rotor 5.

Windings 6—9 cut through the flux generated by poles 1 and 2 and associated coils 3 and 4. The current which results in windings 6—9 is rectified by the aforesaid bridge circuit and is passed to windings 11—14. The currents traversing the windings 11—14 interact with the DC magnetic fluxes of the inner stator poles 15—18 energized either by DC coils 19—22 or by permanent magnets.

The DC magnetic flux of the inner stator links through the arc of the hollow rotor 5, and so does the pulsating magnetic flux established by the poles 1 and 2.

The interaction of the DC magnetic flux and the direct current flowing through the windings 11—14 results in a unidirectional torque applied to the inner surface of the rotor 5. As the motor comes up to speed, an asynchronous torque also appears at the outer surface of the rotor.

According to the invention, a similar arrangement applies to a noncommutator electric motor with a ferromagnetic disc rotor carrying AC and DC windings on the opposite sides and placed between two parallel stators.

Motor speed control and reversal can be accomplished by varying the excitation current in the coils on the poles 15—18 and by shifting the axis of the resultant flux, such as by mechanically shifting the inner stator with respect to the outer stator.

Instead of rectifiers, use may be made of amplifier-demodulators (such as based on transistors or thyristors and controlled by the AC rotor winding voltage) whose outputs are connected to the DC windings.

I claim:

1. A motor comprising spaced sources of flux defining a space therebetween, the sources being respectively sources of AC and DC flux, a rotor between said sources, AC and DC windings on the rotor operatively disposed with respect to the corresponding source, and rectifier means coupling said windings, the AC winding operating with the source of AC flux to generate an AC current which is rectified by said rectifier means and passed to said DC winding as a DC current which cooperates with the source of DC flux to generate a torque on said rotor, said rotor being a hollow symmetrical body of rotation having inner and outer surfaces on which said windings are separately mounted.

2. A motor as claimed in claim 1 wherein the sources are concentric and spaced and define an annular space therebetween.

3. A motor as claimed in claim 1 wherein said body of rotation is a cylinder.